G. F. ROYER & L. F. ZWEIBEL.
UNIVERSAL JOINT.
APPLICATION FILED DEC. 22, 1913.
1,132,123.
Patented Mar. 16, 1915.
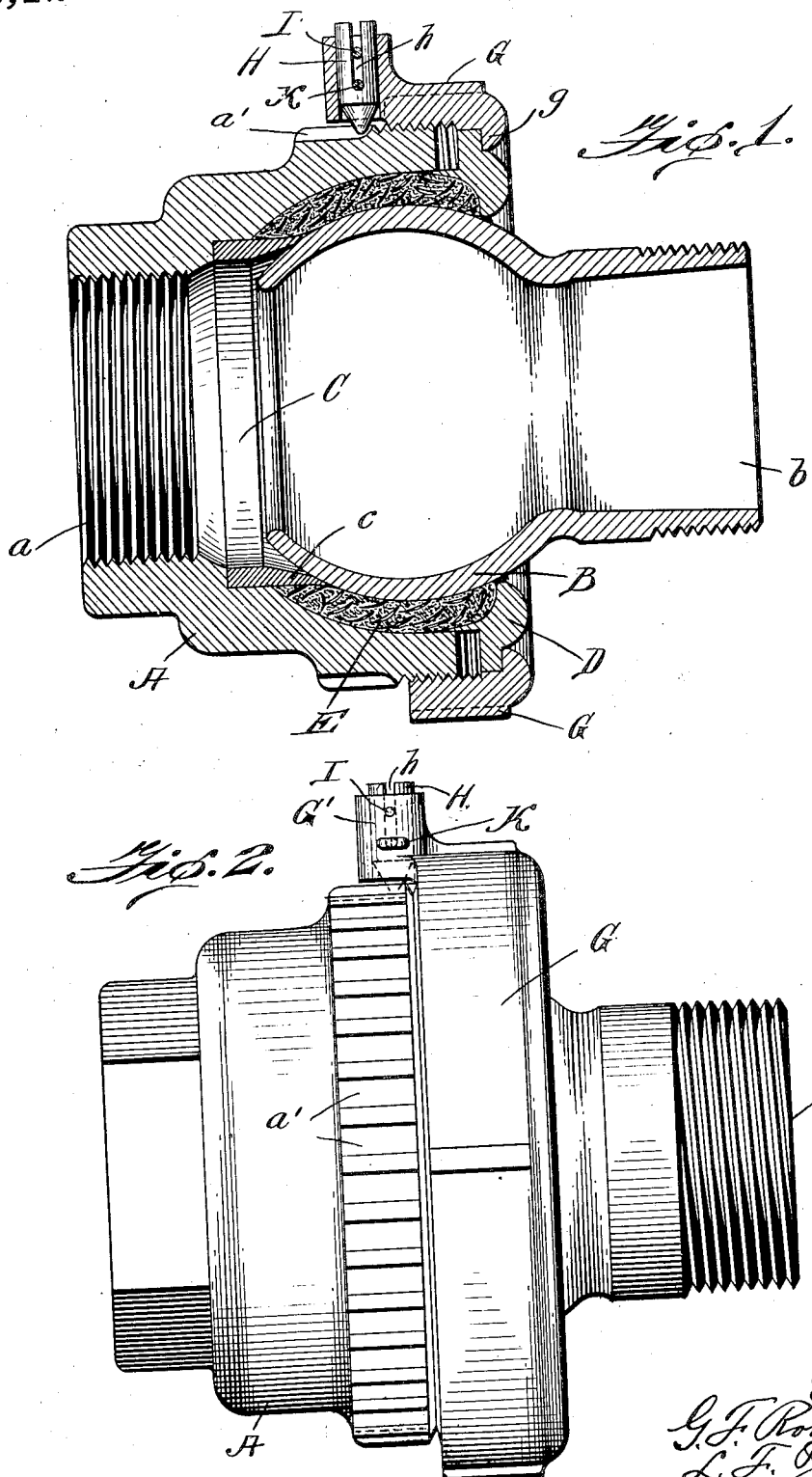

UNITED STATES PATENT OFFICE.

GEORGE F. ROYER AND LEWIS F. ZWEIBEL, OF WILKES-BARRE, PENNSYLVANIA.

UNIVERSAL JOINT.

1,132,123.

Specification of Letters Patent. Patented Mar. 16, 1915.

Application filed December 22, 1913. Serial No. 808,241.

*To all whom it may concern:*

Be it known that we, GEORGE F. ROYER and LEWIS F. ZWEIBEL, citizens of the United States, and residents of Wilkes-Barre, county of Luzerne, State of Pennsylvania, have invented certain new and useful Improvements in Universal Joints, of which the following is a specification.

The present invention relates to improvements in ball and socket pipe joints and is particularly adapted for use as a connection between train pipes, especially the connection between a locomotive and its tender.

The object of the invention is to provide a simple and durable construction including a packing that can be compressed to effectually prevent leakage and provide a smooth yielding contact surface for the ball, thus avoiding the clamping of the ball between rigid surfaces.

An embodiment of the invention is illustrated in the accompanying drawing, in which:

Figure 1 is a longitudinal section through a joint constructed in accordance with the invention; Fig. 2 is an elevation.

Referring to the drawing, the improved joint comprises a socket member or casing A, shown as having at one end an interior thread *a* by means of which it may be secured upon a suitable pipe and a ball B having an exteriorly threaded extension *b* for engagement with a pipe. A soft metal ring C is fitted in a suitable seat formed within the socket member A, said ring having a tapered section *c* which surrounds the ball B and forms a yielding abutment therefor. Within the chamber or space formed between the socket A, ball B, ring C and a gland D is arranged a packing E composed of flake metal, graphite and asbestos fiber. The gland D is adapted to be adjusted to compress the packing E by means of a nut G screwed upon the casing A and having a lip *g* which bears against the outer face of the gland. Means are provided for locking the ring G and gland in any desired position.

As shown, the casing A is provided with an annular series of depressions or grooves *a'* with which is adapted to engage a pin H mounted in a suitable guide G' on the nut G. The pin H is shown as provided with a slot *h* through which extends a pin I riveted at its ends to the guide G' and acting to prevent the pin from being entirely withdrawn from said guide. The pin may be secured in its locking position, as shown, by means of a suitable cotter pin or key K adapted to be passed through alined apertures in the guide G' and the slot *h*. By withdrawing the cotter K the pin H may be moved radially of the ring G out of engagement with the depressions or grooves *a'* and the ring or nut can then be turned, by a suitable spanner, to effect further compression of the packing E if necessary.

It will be seen that the ring C and gland D, by their contact with the outer surface of the ball B, positively prevent waste or escape of any of the packing E and the latter, as described, is of such nature that it can be easily renewed if it becomes worn by adjusting the gland, as above described.

An important feature of the invention is that the compression of the packing E is effected and the joint maintained in proper fluid-tight condition without clamping the ball against any rigid or unyielding surface. If after long use the soft metal ring C becomes undesirably worn, it can be readily removed and replaced. The particular packing which is employed in this joint is capable of being compressed sufficiently to prevent leakage of fluid under pressure and possesses enough internal resistance to compression to withstand the pull and thrust that such a joint is subjected to and, as pointed out, if necessary, further compression thereof is readily effected.

Having thus described the invention what is claimed and desired to be secured by Letters Patent is:

1. The herein described pipe joint comprising a casing or socket member, a ball member positioned within the socket member, a soft metal ring fitted to a seat in the socket member and constituting a yielding abutment for the ball therein, a compressible packing filling the space between the ball and socket that is closed at its inner end by said ring, a gland closing the outer end of said space and adjustable therein to compress the packing and hold the ball in contact with the soft metal ring, a ring nut on the casing engaging said gland, and means for locking the nut in any adjusted position.

2. The herein described pipe joint comprising a casing or socket member having an annular series of recesses in its outer surface, a ball member positioned within the ing a yielding abutment for the ball therein, a compressible packing filling the space between the ball and socket that is closed at its inner end by said ring, a gland closing the outer end of said space and adjustable therein to compress the packing and hold the ball in contact with the soft metal ring, a ring nut on the casing engaging the gland, and a lock pin mounted in said nut and moving with any one of said recesses in the socket member.

In testimony whereof we affix our signatures in the presence of two witnesses.

GEORGE F. ROYER.
LEWIS F. ZWEIBEL.

Witnesses:
  EDWARD N. NOLL,
  E. VARIAN FELTER.